United States Patent
Xu et al.

(10) Patent No.: US 10,171,019 B1
(45) Date of Patent: Jan. 1, 2019

(54) CONTROLLER FOR POWER CONVERTER

(71) Applicants: Toshiba Mitsubishi-Electric Industrial Systems Corporation, Tokyo (JP); Wisconsin Alumni Research Foundation, Madison, WI (US)

(72) Inventors: Yang Xu, Madison, MI (US); Ryo Iida, Tokyo (JP); Robert D. Lorenz, Madison, WI (US); Yukai Wang, Albany, NY (US)

(73) Assignees: Toshiba Mitsubishi-Electric Industrial Systems Corporation, Tokyo (JP); Wisconsin Alumni Research Foundation, Madison, WI (US)

( * ) Notice: Subject to any disclaimer, the term of this patent is extended or adjusted under 35 U.S.C. 154(b) by 0 days.

(21) Appl. No.: 15/636,916

(22) Filed: Jun. 29, 2017

(51) Int. Cl.
| | |
|---|---|
| *H03K 5/00* | (2006.01) |
| *H02P 9/06* | (2006.01) |
| *H02K 1/27* | (2006.01) |
| *H02P 21/14* | (2016.01) |
| *H02P 3/18* | (2006.01) |
| *H02P 21/12* | (2016.01) |
| *H02P 6/18* | (2016.01) |

(52) U.S. Cl.
CPC ............ *H02P 9/06* (2013.01); *H02K 1/2766* (2013.01); *H02P 3/18* (2013.01); *H02P 6/187* (2013.01); *H02P 21/12* (2013.01); *H02P 21/141* (2013.01)

(58) Field of Classification Search
CPC ......... H02P 21/18; H02P 21/26; H02P 21/141
See application file for complete search history.

(56) References Cited

U.S. PATENT DOCUMENTS

2001/0043048 A1* 11/2001 Tajima .................... H02P 21/26
                                                            318/727

FOREIGN PATENT DOCUMENTS

JP           2016-10311           1/2016

OTHER PUBLICATIONS

Holtz, "Sensorless Control of Induction Motor Drives," Proceedings of the IEEE (Aug. 2002), 90:1359-1394.
(Continued)

*Primary Examiner* — Karen Masih
(74) *Attorney, Agent, or Firm* — Finnegan, Henderson, Farabow, Garrett & Dunner, L.L.P.

(57) ABSTRACT

A controller includes a torque command value calculation module configured to calculate a torque command based on a speed command of the motor, an output voltage controlling module configured to control an output voltage of the power converter based on the torque command calculated by the torque command value calculation module, a voltage command value correcting module configured to correct a voltage command to the power converter based on a measured output voltage from the power converter, a flux estimation module configured to estimate stator flux and rotor flux of the motor in a subsequent control period based on the voltage command by the voltage command value correcting module and a measured current of the stator and a motor speed estimation module configured to estimate a speed of the motor in a subsequent control period based on the flux estimated by the flux estimation module.

3 Claims, 19 Drawing Sheets

(56) References Cited

OTHER PUBLICATIONS

Holtz et al., "Drift- and Parameter-Compensated Flux Estimator for Persistent Zero-Stator-Frequency Operation of Sensorless-Controlled Induction Motors," IEEE Transactions on Industry Applications (Jul./Aug. 2003), 39:1052-1060.

Shin et al., "An Improved Stator Flux Estimation for Speed Sensorless Stator Flux Orientation Control of Induction Motors," IEEE Transactions on Power Electronics (Mar. 2000), 15:312-318.

Kim et al., "Sensorless Control of Interior Permanent-Magnet Machine Drives With Zero-Phase Lag Position Estimation," IEEE Transactions on Industry Applications (Nov./Dec. 2003), 39:1726-1733.

Wang et al., "Using Volt-sec. Sensing to Extend the Low Speed Range and the Disturbance Rejection Capability of Back-EMF-based Self-Sensing," 2016 18$^{th}$ European Conference on Power Electronics and Applications (Sep. 2016), pp. 1-10.

Schauder, "Adaptive Speed Identification for Vector Control of Induction Motors Without Rotational Transducers," Conference Record of the IEEE Industry Applications Society Annual Meeting (Oct. 1989), pp. 493-499.

Vasić et al., "A Stator Resistance Estimation Scheme for Speed Sensorless Rotor Flux Oriented Induction Motor Drives," IEEE Transactions on Energy Conservation (Dec. 2003), 18:476-483.

Jansen et al., "A Physically Insightful Approach to the Design and Accuracy Assessment of Flux Observers for Field Oriented Induction Machine Drives," IEEE Transactions on Industry Applications (Jan./Feb. 1994), 30:101-110.

Lorenz, The Emerging Role of Dead-beat, Direct Torque and Flux Control in the Future of Induction Machine Drives, 2008 11$^{th}$ International Conference on Optimization of Electrical and Electronic Equipment (May 2008), pp. 19-27.

Lorenz et al., "Motion Control with Induction Motors," Proceedings of the IEEE (Aug. 1994), 82:1215-1240.

Wang et al., "Loss Manipulation Capabilities of Deadbeat Direct Torque and Flux Control Induction Machine Drives," IEEE Transactions on Industry Applications (Nov./Dec. 2015), 51:4554-4566.

\* cited by examiner

- BACK-EMF TRACKING METHOD
- FLUX TRACKING METHOD

- BACK-EMF TRACKING METHOD
- FLUX TRACKING METHOD

- BACK-EMF TRACKING METHOD
- FLUX TRACKING METHOD

- BACK-EMF TRACKING METHOD
- FLUX TRACKING METHOD

—— FILTERED ENCODER SPEED
----- ESTIMATED SPEED

CONTROLLER FOR POWER CONVERTER

BACKGROUND OF THE INVENTION

Field of the Invention

The present invention relates to a controller for a power converter and a motor driving system.

Background Art

U.S. Pat. No. 9,281,772 B2 discloses a controller for a power converter. The controller can put, on a motor, a brake of good response.

However, in the controller, there is an estimation error of the stator flux of the motor. Consequently, control accuracy is not maintained in a region of low speed of the motor.

SUMMARY OF THE INVENTION

The present invention has been made to solve the above-described problem. The objective of the present invention is to provide a controller for a power converter and a motor driving system, the controller and the system capable to maintain control accuracy in a region of low speed of the motor.

The features and advantages of the present invention may be summarized as follows.

According to one aspect of the present invention, a controller includes a torque command value calculation module configured to calculate a torque command based on a speed command of the motor, an output voltage controlling module configured to control an output voltage of the power converter based on the torque command calculated by the torque command value calculation module, a voltage command value correcting module configured to correct a voltage command to the power converter based on a measured output voltage from the power converter, a flux estimation module configured to estimate stator flux and rotor flux of the motor in a subsequent control period based on the voltage command by the voltage command value correcting module and a measured current of the stator and a motor speed estimation module configured to estimate a speed of the motor in a subsequent control period based on the flux estimated by the flux estimation module.

According to another aspect of the present invention, a motor driving system includes a power converter configured to drive a motor and the above controller configured to control the power converter.

Other and further objects, features and advantages of the invention will appear more fully from the following description.

DETAILED DESCRIPTION OF THE PREFERRED EMBODIMENTS

Figure 1:
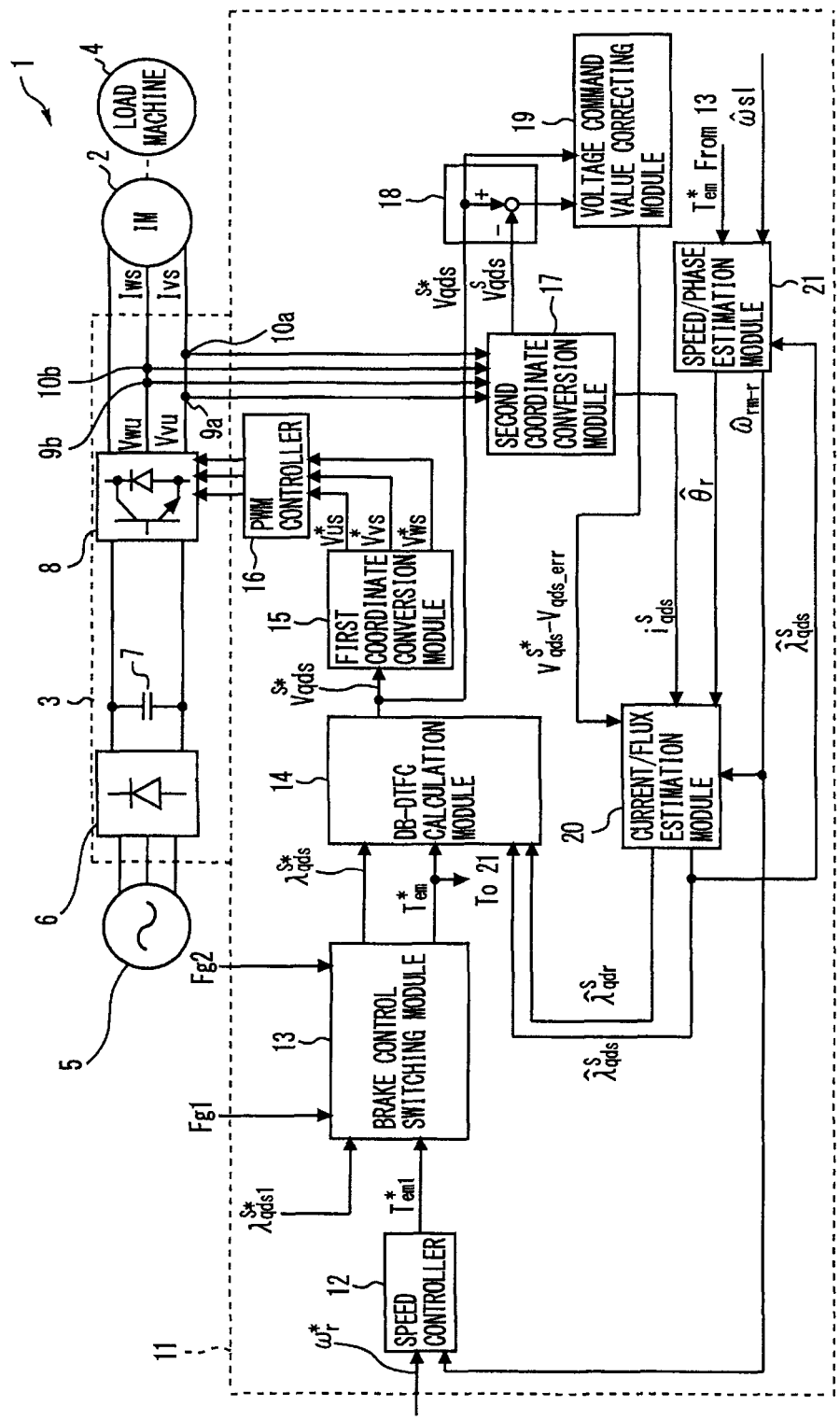
FIG. 1 is a configuration diagram of a motor system to which a controller for a power converter according to the embodiment 1 of the present invention is applied.

An embodiment of the present invention will be described in accordance with the accompanying drawings. It should be noted that in the drawings, the same or corresponding parts are denoted by the same reference signs. Overlapping description of such parts will be simplified or omitted as appropriate.

First Embodiment

FIG. 1 is a configuration diagram of a motor system to which a controller for a power converter according to an embodiment 1 of the present invention is applied.

In FIG. 1, a motor system 1 includes a motor 2 and a motor driving system 3.

An output part of the motor 2 is connected to an input part of a load machine 4. For example, the load machine 4 is an inertia load.

An input part of the motor driving system 3 is connected to an output part of an AC power supply 5. For example, the AC power supply 5 is a grid.

The motor driving system 3 includes a diode rectifier 6, a capacitor 7, an inverter 8, a first current detector 9a, a second current detector 9b, a first voltage detector 10a, a second voltage detector 10b and controller 11.

The diode rectifier 6 converts, into DC power, the three-phase AC power supplied from the AC power supply 5.

The capacitor 7 is provided across a DC link on the output side of the diode rectifier 6. The capacitor 7 is used to smooth the DC voltage applied to the DC link.

The inverter 8 is converts the DC power supplied from the diode rectifier 6 into three-phase AC power for driving the induction motor 2. The inverter 8 is a voltage source inverter. The inverter 8 is subjected to variable voltage variable frequency (VVVF) control through pulse width modulation (PWM) control.

The power conversion circuit of the inverter 8 is formed of three arms. One of the arms includes an upper arm and a lower arm. The upper and lower arms are each formed of at least one switching element.

The first current detector 9a is provided at the v-phase of the output side of the inverter 8. The first current detector 9a detects the v-phase stator current Ivs. The second current detector 9b is provided at the w-phase of the output side of the inverter 8. The second current detector 9b detects the v-phase stator current Iws.

The first voltage detector 10a is provided at the v-phase of the output side of the inverter 8. The first current detector 10a detects the v-phase stator voltage Vvs. The second voltage detector 10b is provided at the w-phase of the output side of the inverter 8. The second voltage 10b detects the v-phase stator voltage Vws.

The first voltage detector 10a may be provided between the u-phase and the v-phase of the output side of the inverter 8. In this case, the first voltage detector 10a detects the stator line-to-line voltage Vuv. The second voltage detector 10b may be provided between the u-phase and the w-phase of the output side of the inverter 8. In this case, the second voltage detector 10b detects the stator line-to line voltage Vuw.

The controller 11 a speed controller 12, a brake control switching module 13, a DB-DTFC calculation module 14, a first coordinate conversion module 15, PWM controller 16, a second coordinate conversion module 17, a subtraction module 18, a voltage command value correcting module 19, a current/flux estimation module 20 and a speed/phase estimation module 21.

The speed controller 12 calculates the torque command value $T_{em1}^*(k)$ as s torque command value calculation module so that the rotor angular velocity estimate value $\hat{\omega}_{rm-r}(k)$ will follow the rotor angular velocity command value $\hat{\omega}_r^*(k)$ obtained from an external device.

Here, "k" in the code parenthesis is a variable representing the number of control sampling step. For example, with respect to the torque command value $T_{em1}^*(k)$, the torque command value $T_{em1}^*(k-1)$ is the torque command value in control sampling one step before. "k"s in the following code parenthesis are also variables indicating the number of control sampling steps.

The brake control switching module 13 receives the calculated torque command value $T_{em1}^*(k)$ from the speed controller 12, and receives a preset stator dq-axes flux command value $\lambda_{qds1}^{S*}(k)$, a brake preparation flag Fg1 and a brake start flag Fg2. The brake control switching module 13 switches the torque command value $T_{em}^*(k)$ and the stator dq-axes flux command value $\lambda_{qds}^{S*}(k)$ to the values used during a normal operation and a braking operation based on the brake preparation flag Fg1 and the brake start flag Fg2 obtained from the external device.

Here, "dq-axes" represents the d axis and the q axis orthogonal to each other with the output of the inverter 8 as the reference phase. For example, the stator dq-axes flux command value $\lambda_{qds}^{S*}(k)$ represents the d-axis component $\lambda_{ds}^{S*}(k)$ of the stator flux command value and the q-axis component $\lambda_{qs}^{S*}(k)$ of the stator flux command value. In the following description, symbols with the suffix "qds" are the symbols representing both the d-axis component and the q-axis component.

The DB-DTFC calculation module 14 calculates the stator dq-axes voltage command value $V_{qds}^{S*}(k)$ based on the torque command value $T_{em1}^*(k)$, the stator dq-axes flux command value $\lambda_{qds}^{S*}(k)$, the stator dq-axes flux estimate value $\hat{\lambda}_{qds}^{S}(k)$ and the rotor dq-axes flux estimate value $\hat{\lambda}_{qdr}^{S}(k)$. The DB-DTFC calculation module 14 employs, as a control method, a dead-beat direct torque & flux control (DB-DTFC) method.

The first coordinate conversion module 15 converts the stator dq-axes voltage command value $V_{qds}^{S*}(k)$ into three-phase stator voltage command values $V_{us}^*(k)$, $V_{vs}^*(k)$ and $V_{ws}^*(k)$.

The PWM controller 16 converts the three-phase stator voltage command values $V_{us}^*(k)$, $V_{vs}^*(k)$ and $V_{ws}^*(k)$ into gate pulses for the inverter 8. The PWM controller 16 outputs the gate pulses to the inverter 8.

The second coordinate conversion module 17 converts the stator currents Ivs, Iws into a stator dq-axes current measured value $i_{qds}^{s}(k-1)$. The second coordinate conversion module 17 converts the stator voltages Vvu, Vwu into a stator dq-axes voltage measured value $V_{qds}^{s}(k-1)$.

Here, the stator dq-axes current measured value $q_{qds}^{s}(k-1)$ and the stator dq-axes voltage measured value $V_{qds}^{s}(k-1)$ are values obtained by converting the actual measurement values by dq transformation. For this reason, these fundamental wave components are averaged.

The subtraction module 18 subtracts the stator dq-axes voltage $V_{qds}^{s}(k-1)$ from the stator dq-axes voltage command value $V_{qds}^{S*}(k)$.

The voltage command value correcting module 19 calculates a corrected voltage command value $V_{qds\_corrected}^{S*}(k)$ by the stator dq-axes voltage command value $V_{qds}^{S*}(k)$ and the calculation result of the subtraction module 18. Specifically, the voltage command value correcting module 19 calculates an error of the actually measured value with respect to the stator dq-axes voltage command value $V_{qds}^{S*}(k)$. On this occasion, the error of the error of the actually measured value is expressed by the following equation (1):

$$V_{qsd\_err}^{s}(k-1) = V_{qds}^{s*}(k-1) - V_{qds}^{s}(k-1) \quad (1)$$

The corrected voltage command value is expressed by the following equation (2):

$$V_{qds\_corrected}^{s*}(k) = V_{qds}^{s*}(k) - V_{qds\_err}^{s}(k-1) \quad (2)$$

In this way, the voltage command value is corrected with a lag by one control period.

The current/flux estimation module 20 calculates the stator dq-axes flux estimate value $\hat{\lambda}_{qds}^{S}(k)$ and the rotor dq-axes flux estimate value $\hat{\lambda}_{qdr}^{S}(k)$ as a flux estimation module based on the rotor angle estimate value $\hat{\theta}_r(k)$, the corrected voltage command value $[V_{qds}^{S*}(k) - V_{qds\_err}^{s}(k-1)]$ and the stator dq-axes current measured value $i_{qds}^{s}(k-1)$.

The speed/phase estimation module 21 calculates a rotor angle estimate value $\hat{\theta}_r(k)$ and a rotor angular velocity estimate value $\hat{\omega}_{rm-r}(k)$ as a motor speed estimation module based on the torque command value $T_{em}^*(k)$ and a slip frequency estimate value $\hat{\omega}_{sl}$.

Next, the current/flux estimation module 20 and the speed/phase estimation module 21 will be described with the use of FIG. 2.

Figure 2:
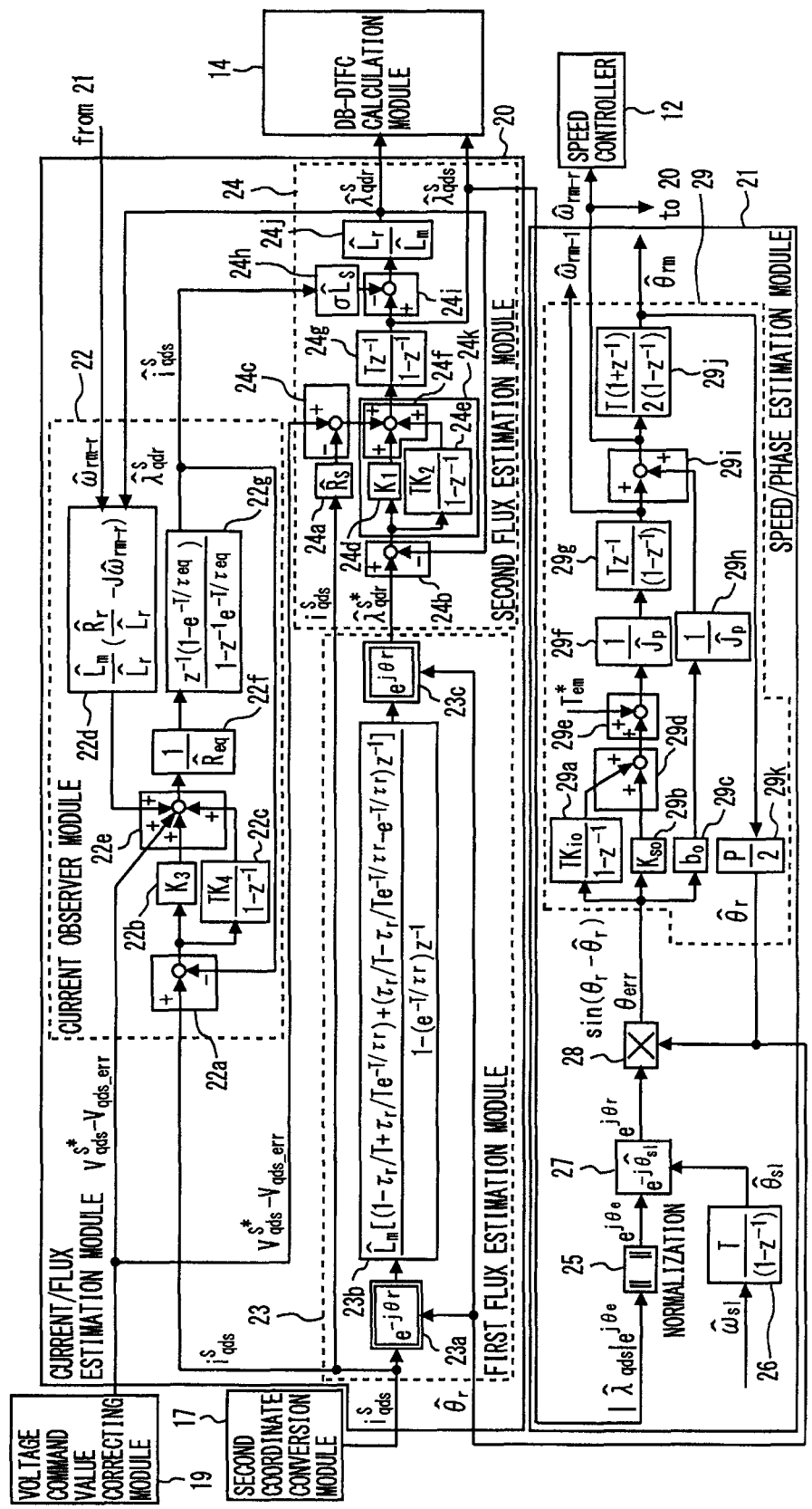
FIG. 2 is a block diagram of main sections of the controller for the power converter according to the embodiment 1 of the present invention.

FIG. 2 is a block diagram of the main sections of the controller for the power converter according to the embodiment 1 of the present invention.

As illustrated in FIG. 2, the current/flux estimation module 20 includes a current observer module 22, a first flux estimation module 23 and a second flux estimation module 24.

The current observer module 22 calculates a stator dq-axes current estimate value $\hat{i}_{qds}^{s}$ in a subsequent control period based on the voltage value $(V_{qds}^{S*} - V_{qds\_err})$ corrected by the voltage command value correcting module 19, the stator dq-axes current measured value $i_{qds}^{s}$, a rotor angular velocity estimated value $\hat{\omega}_{rm-1}$ and a rotor dq-axes flux estimate value $\hat{\lambda}_{qdr}^{S}$. The stator dq-axes current measured value $i_{qds}^{s}$ is the output of the second coordinate conversion module 17. The rotor angular velocity estimated value $\hat{\omega}_{rm-1}$ is an output of the speed/phase estimation module 21. The rotor dq-axes flux estimate value $\hat{\lambda}_{qdr}^{S}$ an output of the second flux estimation module 24.

On this occasion, the proportional gain $K_3$, the integral gain $K_4$, the estimate value $\hat{R}_{eq}$ of the equivalent resistance, the estimate value $\hat{L}_r$ of the rotor winding inductance, the estimate value $\hat{L}_m$ of the magnetizing inductance, the rotor resistance $\hat{R}_r$ and the inertia moment J, the equivalent time constant $\tau_{eq}$, the control period T and the delay operator $z^{-1}$ are used.

Specifically, the current observer module 22 includes a first block 22a, a second block 22b, a third block 22c, a fourth block 22d, a fifth block 22e, a sixth block 22f, and a seventh block 22g.

The first block 22a calculates a value obtained by subtracting the stator dq-axes current estimate value $\hat{i}_{qds}^{s}$ from the stator dq-axes current measured value $i_{qds}^{s}$. The stator dq-axes current estimate value $\hat{i}_{qds}^{s}$ is the output of the seventh block 22g. The output of the first block 22a is input into the second block 22b and the third block 22c. The second block 22b is a proportional circuit of gain $K_3$. The third block 22c is an integrating circuit of gain $K_4$. The fourth block calculates a complemented value from a rotor angular velocity estimated value $\hat{\omega}_{rm-1}$ and a rotor dq-axes flux estimate value $\lambda_{qdr}^{S}$. The rotor angular velocity estimated value $\hat{\omega}_{rm-1}$ is an output of the speed/phase estimation module 21. The rotor dq-axes flux estimate value $\hat{\lambda}_{qdr}^{S}$ is an output of the second flux estimation module 24.

The fourth block 22d calculates a value obtained by multiplying the rotor dq-axes flux estimate value $\hat{\lambda}_{qdr}^{S}$ by the transfer coefficient G1 expressed by the following equation (3).

$$G1 = \frac{\hat{L}_m}{\hat{L}_r}\left(\frac{\hat{R}_r}{\hat{L}_r} - J\bar{\omega}_{rm-1}\right) \quad (3)$$

The fifth block 22e calculates a value obtained by adding the voltage command value ($V_{qds}^{S*}-V_{qds\_err}$) corrected by the voltage command value correcting module 19, the value calculated by the second block 22b, the value calculated by the third block 22c, the value calculated by the fourth block 22d.

The sixth block 22f calculates a value obtained by dividing the value calculated by the fifth block 22e by the estimate value $\hat{R}_{eq}$ of the equivalent resistance.

The output of the sixth block 22f is input into the seventh block 22g. The seventh block 22g calculates a transfer function expressed in the equation (4). The seventh block 22g outputs a stator dq-axes current estimate value $\hat{i}_{qds}^{s}$.

$$G2 = \frac{z^{-1}(1 - e^{-T/\tau_{eq}})}{1 - z^{-1}e^{-T/\tau_{eq}}} \quad (4)$$

The stator dq-axes current estimate value $\hat{i}_{qds}^{s}$ is input into the first block 22a and the second flux estimation module 24.

The first flux estimation module 23 calculates an rotor dq-axes flux estimate value $\hat{\lambda}_{qdr}^{S*}$ based on the rotor angle estimate value $\hat{\theta}_r$ and the stator dq-axes current measured value $i_{qds}^{s}$. The rotor angle estimate value $\hat{\theta}_r$ is an output of the speed/phase estimation module 21. the stator dq-axes current measured value $i_{qds}^{s}$ is an output of the second coordinate conversion module 17.

On this occasion, the estimate value $\hat{L}_m$ of the magnetizing inductance of the motor 2, the rotor time constant $\tau_r$ of the motor 2, the control period T and the delay operator $z^{-1}$ are used.

Specifically, the first flux estimation module 23 includes a first block 23a, a second block 23b, and a third block 23c.

The first block 23a converts the stator dq-axes current measured value $i_{qds}^{s}$ to the value of the rotor coordinate system by the rotor angle estimate value $\hat{\theta}_r$.
The output of the first block 23a is the input of the second block 23b.

The second block 23b multiplies the value calculated by the first block 23a by the transfer function G3 expressed by the following equation (5) to calculate the stator dq-axes flux estimate value of the primary hold.

$$G3 = \frac{\hat{L}_m\lfloor(1 - \tau_r/T + \tau_r/Te^{-T/\tau_r}) + (\tau_r/T - \tau_r/Te^{-T/\tau^r} - e^{-T/\tau_r})z^{-1}\rfloor}{1 - (e^{-T/\tau_r})z^{-1}} \quad (5)$$

The output of the second block 23b is the input of the third block 23c. The third block 23c converts the output of the second block 23b to the value of the rotor coordinate system by the rotor angle estimate value $\hat{\theta}_r$. The output of the second block 23b is the rotor dq-axes flux estimate value $\hat{\lambda}_{qdr}^{S*}$. The rotor dq-axes flux estimate value $\hat{\lambda}_{qdr}^{S*}$ is input into second flux estimation module 24.

The second flux estimation module 24 calculates a stator dq-axes flux estimate value $\hat{\lambda}_{qds}^{S}$ and a rotor dq-axes flux estimate value $\hat{\lambda}_{qdr}^{S}$ in a subsequent control period based on the voltage command value ($V_{qds}^{S*}-V_{qds\_err}$) corrected by the voltage command value correcting module 19, the stator dq-axes current measured value $i_{qds}^{s}$ output of the second coordinate conversion module 17, the stator dq-axes current estimate value $\hat{i}_{qds}^{s}$ estimated by the current observer module 22, the rotor dq-axes flux estimate value $\hat{\lambda}_{qdr}^{S*}$ estimated by the first flux estimation module 23. On this occasion, the proportional gain $K_1$, the integral gain $K_2$, the estimate value $\hat{R}_s$ of the stator resistance, the leakage factor $\sigma$, the estimate value $\hat{L}_r$ of the rotor winding inductance, the estimate value of $\hat{L}_s$ of the stator winding inductance, the estimate value $\hat{L}_m$ of the magnetizing inductance, the control period T and the delay operator $z^{-1}$ are used.

Specifically, the second flux estimation module 24 includes a first block 24a, a second block 24b, a third block 24c, a fourth block 24d, a fifth block 24e, a sixth block 24f, a seventh block 24g, and a eighth block 24h, a ninth block 24i, and a tenth block 24j.

The first block 24a calculates a value of the voltage drop by multiplying the stator dq-axes current measured value $i_{qds}^{s}$ by the estimate value $\hat{R}_s$ of the stator resistance. The second block 24b subtracts the rotor dq-axes flux estimate value $\hat{\lambda}_{qdr}^{S}$ which is the output of the tenth block 24j from the rotor dq-axes flux estimate value $\hat{\lambda}_{qdr}^{S*}$. The third block 24c calculates a value obtained by subtracting the value calculated by the first block 24a from the voltage command value ($V_{qds}^{S*}-V_{qds\_err}$) corrected by the voltage command value correcting module 19.

The fourth block 24d, the fifth block 24e, and the sixth block 24f function as a transition frequency determination unit 24k. The transition frequency determining unit 24k determines the transition frequency between the first flux estimation module 23 and the second flux estimation module 24.

Specifically, the fourth block 24d calculates a value obtained by multiplying the value calculated by the second block 24b by the proportional gain $K_1$.

The fifth block 24e is an integrating circuit of gain $K_2$. The fifth block 24e calculates an integral of the output of the fourth block 24d.

The sixth block 24f calculates a value of the input voltage of the motor 2 by adding the value calculated by the third block 24c, the value calculated by the fourth block 24d and the value calculated by the fifth block 24e.

The seventh block 24g calculates the stator dq-axes flux estimate value $\hat{\lambda}_{qds}^{S}$ by integrating the output of the sixth block 24f.

The eighth block 24h calculates a value obtained by multiplying the stator dq-axes current estimate value $\hat{i}_{qds}^{s}$ by the factor G4 expressed by the following equation (6).

$$G4 = \sigma\hat{L}_s \quad (6)$$

The ninth block 24i calculates a value obtained by subtracting the value calculated by the eighth block 24h from the stator dq-axes flux estimate value $\hat{\lambda}_{qds}^{S}$ calculated by the seventh block 24g.

The tenth block 24j multiplies the value calculated by the ninth block 24i by the factor G5 expressed by the following equation (7) to calculate the rotor dq-axes flux estimate value $\hat{\lambda}_{qdr}^{S}$.

$$G5 = \frac{\hat{L}_r}{\hat{L}_m} \quad (7)$$

For example, in the case where the frequency of the rotor flux of the motor 2 is lower than the transition frequency, the first flux estimation module 23 is dominant. For example, in the case where the frequency of the rotor flux of the motor 2 is higher than the transition frequency, the second flux estimation module 24 is dominant. As a result, the rotor dq-axes flux estimate value is accurately calculated.

The speed/phase estimation module 21 includes a phase estimation module 25, a slip angle estimation module 26, a flux vector rotation module 27, a phase error estimation module 28 and a speed and position observing module 29.

The phase estimation module 25 calculates an estimate value $e^{j\theta_e}$ of a phase of the flux vector of the motor 2 from the stator dq-axes flux estimate value $\hat{\lambda}_{qds}^{S}$ calculated by the current/flux estimation module 20. For example, the phase of flux vector can be the phase of the stator flux vector calculated by the current/flux estimation module 20. The stator dq-axes flux estimate value $\hat{\lambda}_{qds}^{S}$ which is the output of the current/flux estimation module 20 is input into phase estimation module 25. In particular, the phase estimation module 25 calculates an estimate value $e^{j\theta_e}$ of a phase of the stator flux vector of the motor 2 by the following equation (8).

$$e^{j\theta_e} = \frac{|\hat{\lambda}_{qd}|e^{j\theta_e}}{|\hat{\lambda}_{qd}e^{j\theta_e}|} \qquad (8)$$

An estimate value $\hat{\omega}_{sl}$ of a slip frequency of the motor 2 is calculated with the circuitry not shown and is input to the slip angle estimation module 26. The estimate value $\hat{\omega}_{sl}$ of the slip frequency is calculated using the following equation (9).

$$\hat{\omega}_{sl} = \frac{L_s\left(i_{qs}^e + \sigma\tau_r\frac{di_{qs}^e}{dt}\right)}{\tau_r(\lambda_{ds}^e - \sigma L_s i_{ds}^e)} \qquad (9)$$

The slip angle estimation module 26 calculates a slip angle estimate value $\theta_{sl}$. The slip angle estimate value $\theta_{sl}$ is calculated by integrating the estimate value $\hat{\omega}_{sl}$ of the slip frequency. The flux vector rotation module 27 calculates an rotor electrical angle estimate value $\hat{\theta}_r$ based on estimate value $e^{j\theta_e}$ of a phase of the flux vector calculated by the phase estimation module 25 and the slip angle estimate value $\hat{\theta}_{sl}$ calculated by the slip angle estimation module 26.

The phase error estimation module 28 calculates an estimate value $\theta_{err}$ of rotor electrical angle error is by performing a cross product of the two rotor electrical angles calculated by the flux vector rotation module 27 and the speed and position observing module 29.

The speed and position observing module 29 calculates rotor angular estimate values $\hat{\omega}_{em-1}$, $\hat{\omega}_{em-r}$, an mechanical angle estimate value $\hat{\theta}_{rm}$, electrical angle estimate value $\hat{\theta}_r$ based on the estimate value $\theta_{err}$ calculated by phase error estimation module 28.

Specifically, The speed and position observing module 29 includes a first block 29a, a second block 29b, a third block 29c, a fourth block 29d, a fifth block 29e, a seventh block 29f, an eighth block 29g, and a ninth block 29h and a tenth block 29i.

The first block 29a is an integrating circuit of gain $K_{i0}$. The first block 29a calculates an integral of the estimate value $\theta_{err}$ calculated by phase error estimation module 28.

The second block 29b corrects the estimated value $\theta_{err}$ estimated by the phase error estimation module 28 by multiplying the estimated value $\theta_{err}$ estimated by the phase error estimation module 28 and the gain $K_{so}$.

The third block 29c corrects the estimated value $\theta_{err}$ estimated by the phase error estimation module 28 by multiplying the estimated value $\theta_{err}$ estimated by the phase error estimation module 28 and the gain $b_o$.

The fourth block 29d calculates a value obtained by adding the value calculated by the first block 29a and the value calculated by the second block 29b.

The fifth block 29e calculates a value obtained by adding the value calculated by the fourth block 28d and the torque command value $T_{em}^*$.

The seventh block 29g calculates a rotor mechanical angular velocity estimate value $\hat{\omega}_{rm-1}$. The seventh block 29g is an integrating circuit. The seventh block 29g calculates an integral of the output of the sixth block 29f.

The eighth block 29h calculates the speed correction value by dividing the value calculated by the third block 29c by the estimated value $\hat{J}_p$ of the moment of inertia.

The ninth block 29i calculates a rotor mechanical angular velocity estimate value $\hat{\omega}_{rm-r}$ by adding the rotor mechanical angular velocity estimate value $\hat{\omega}_{rm-1}$ calculated by the seventh block 29g and the speed correction value obtained by the eighth block 29h.

The tenth block 29j calculates a rotor mechanical angle estimate value $\hat{\theta}_{rm}$. The tenth block 29j is an integrating circuit. The seventh block 29g calculates an integral of the rotor mechanical angular velocity estimate value $\hat{\omega}_{rm-r}$.

The eleventh block 29k calculates the rotor electrical angle estimate value $\hat{\theta}_r$ by dividing the value obtained by multiplying the rotor mechanical angle estimate value $\hat{\theta}_{rm}$ calculated by the tenth block 29j by the number of poles P of the motor 2 by 2.

Next, an estimate value of flux of the stator of the motor 2 will be described with use of FIG. 3 and FIG. 4.

Figure 3:
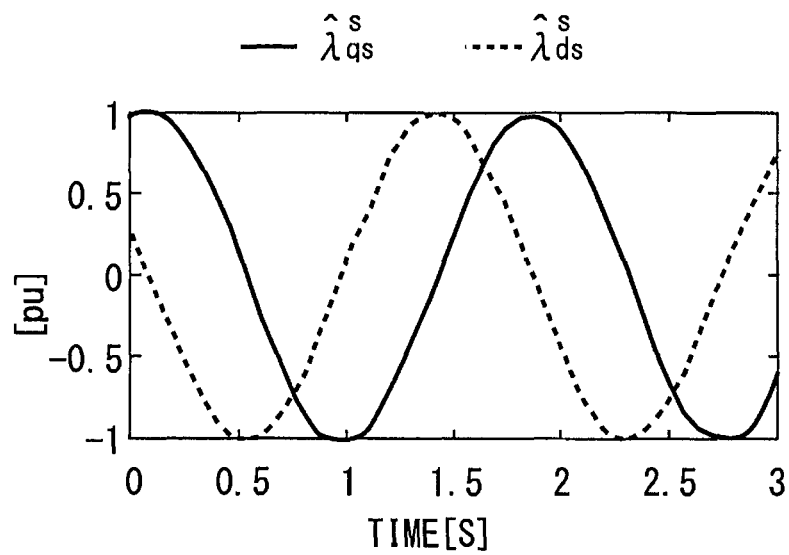
FIG. 3 is a graph showing an estimate value of the stator flux of the motor in the case where the voltage command value is not corrected by the controller for the power converter according to the embodiment 1 of the present invention.

FIG. 3 is a graph showing an estimate value of the stator flux of the motor in the case where the voltage command is not corrected by the controller for the power converter according to the embodiment 1 of the present invention. FIG. 4 is a graph showing an estimate value of the stator flux of the motor in the case where the voltage command is corrected by the controller for the power converter according to the embodiment 1 of the present invention.

Figure 4:
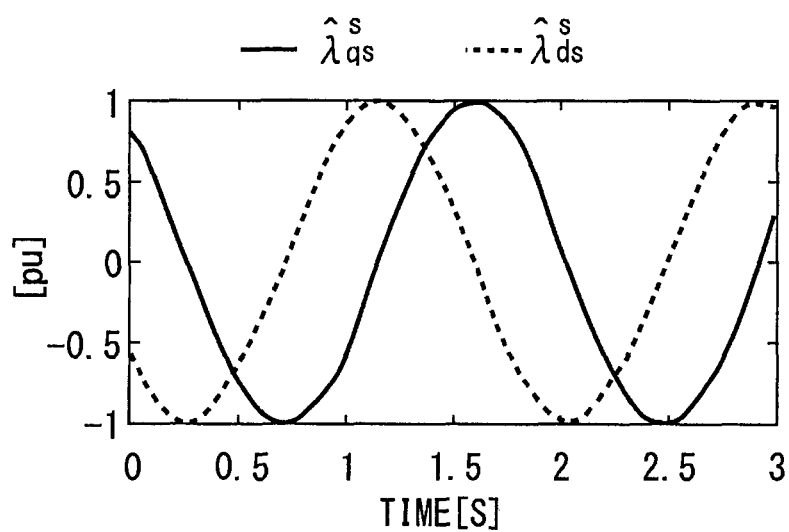
FIG. 4 is a graph showing an estimate value of the stator flux of the motor in the case where the voltage command value is corrected by the controller for the power converter according to the embodiment 1 of the present invention.

As illustrated in FIG. 3 and FIG. 4, in the case where the voltage command is corrected, distortion of the estimate value of the stator flux of the motor 2 is reduced. As a result, in the case where the voltage command is corrected, the stator flux of the motor 2 is more accurately estimated.

Next, the estimated speed of the motor 2 will be described with the use of FIG. 5 to FIG. 7.

Figure 5:
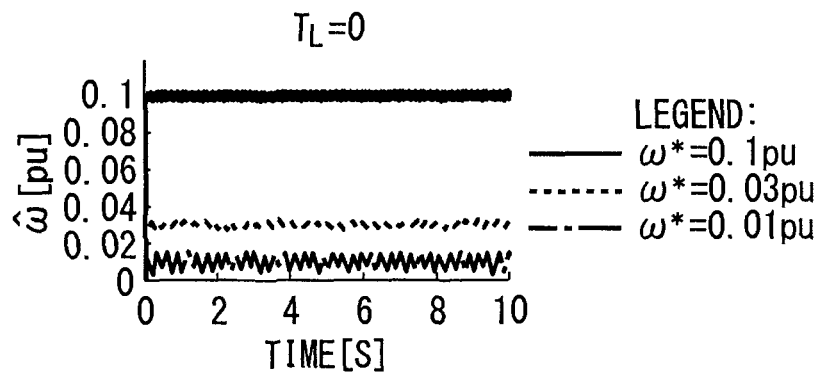
FIG. 5 is a graph showing an estimate value of speed of the motor controlled by the controller for the power converter according to the embodiment 1 of the present invention.
Figure 6:
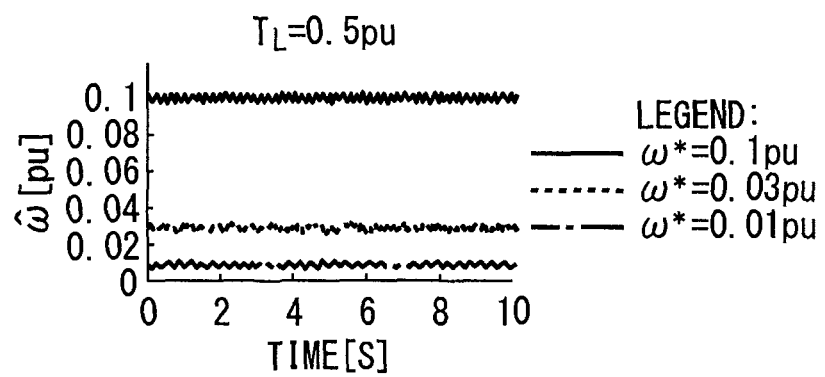
FIG. 6 is a graph showing an estimate value of speed of the motor controlled by the controller for the power converter according to the embodiment 1 of the present invention.
Figure 7:
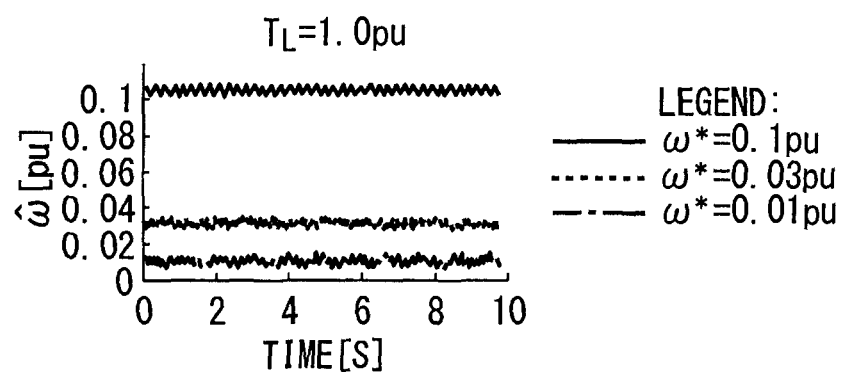
FIG. 7 is a graph showing an estimate value of speed of the motor controlled by the controller for the power converter according to the embodiment 1 of the present invention.

FIG. 5 to FIG. 7 are graphs showing the estimated speed of the motor controlled by the controller for the power converter according to the embodiment 1 of the present invention.

As illustrated in FIG. 5 to FIG. 7, in any load condition from 0 to 1.0 pu, the lowest speed of the motor 2 is 0.01 pu. As a result, the operating range in control by the controller 9 is significantly extended.

Next, speed ripple and torque command ripple will be described with use of FIG. 8 to FIG. 13.

Figure 8:
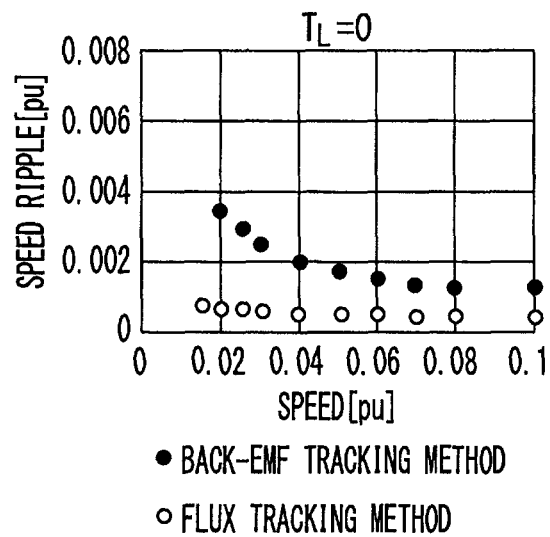
FIG. 8 is a graph showing comparison of a speed ripple in control by the controller for the power converter according to the embodiment 1 of the present invention and a speed ripple in control by back-EMF tracking method.
Figure 9:
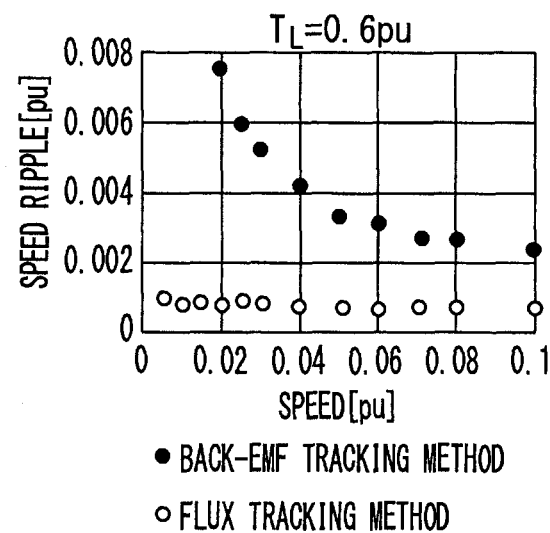
FIG. 9 is a graph showing comparison of a speed ripple in control by the controller for the power converter according to the embodiment 1 of the present invention and a speed ripple in control by a back-EMF tracking method.
Figure 10:
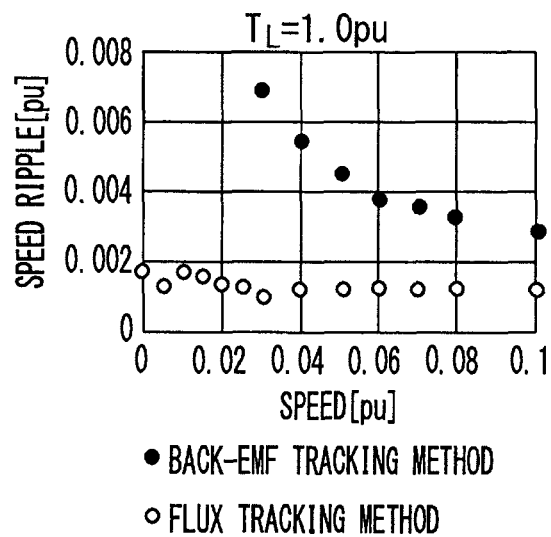
FIG. 10 is a graph showing comparison of a speed ripple in control by the controller for the power converter according to the embodiment 1 of the present invention and a speed ripple in control by a back-EMF tracking method.
Figure 11:
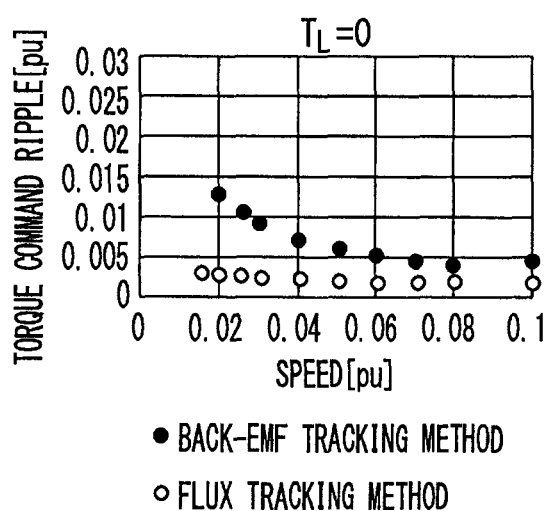
FIG. 11 is a graph showing comparison of a torque command ripple in control by the controller for the power converter according to the embodiment 1 of the present invention and a torque command ripple in control by a back-EMF tracking method.
Figure 12:
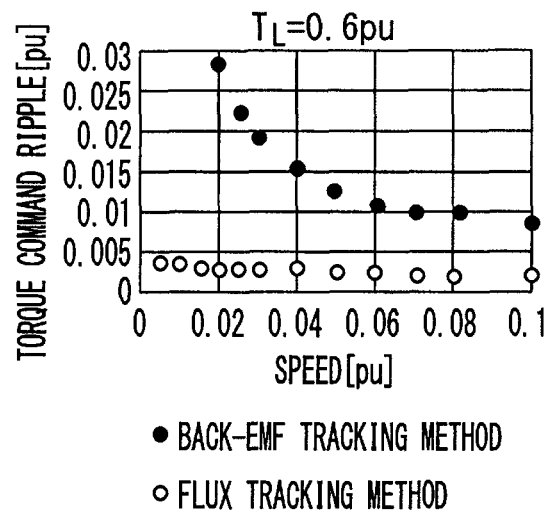
FIG. 12 is a graph showing comparison of a torque command ripple in control by the controller for the power converter according to the embodiment 1 of the present invention and a torque command ripple in control by a back-EMF tracking method.
Figure 13:
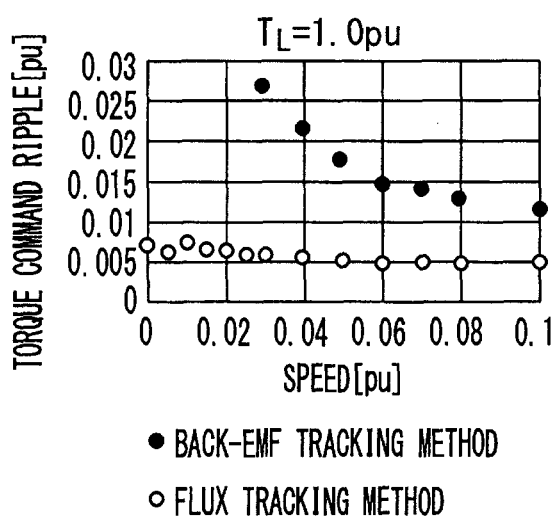
FIG. 13 is a graph showing comparison of a torque command ripple in control by the controller for the power converter according to embodiment 1 of the present invention and a torque command ripple in control by a back-EMF tracking method.

FIG. 8 to FIG. 10 are graphs showing comparison of a speed ripple in control by the controller for the power converter according to the embodiment 1 of the present invention and a speed ripple in control by back-EMF tracking method. FIG. 11 to FIG. 13 are graphs showing comparison of a torque command ripple in control by the controller for the power converter according to the embodiment 1 of the present invention and a speed ripple in control by a back-EMF tracking method.

In control by the controller, there is less ripple in the estimated speed compared with the back-EMF tracking method. Thus, there is less ripple in the torque command.

As speed of the motor 2 decreases, the speed ripple and the torque command ripple using the back-EMF tracking method increases rapidly as the signal to ratio is worse at lower speeds. On the contrary, the speed ripple and the torque command ripple in control by the controller 9 do not increase too much as speed decreases.

For example, as illustrated in FIG. 8 to FIG. 10, control by the controller 9 reduces the speed ripple compared with the back-EMF tracking method.

For example, as illustrated in FIG. 11 to FIG. 13, control by the controller 9 reduces the torque command ripple compared with the back-EMF tracking method.

As a result, the operating range in control by the controller 9 is largely extended compared with the back-EMF tracking method.

Next, dynamic stiffness by the controller 9 will be described with the use of FIG. 14 to FIG. 19.

Figure 14:
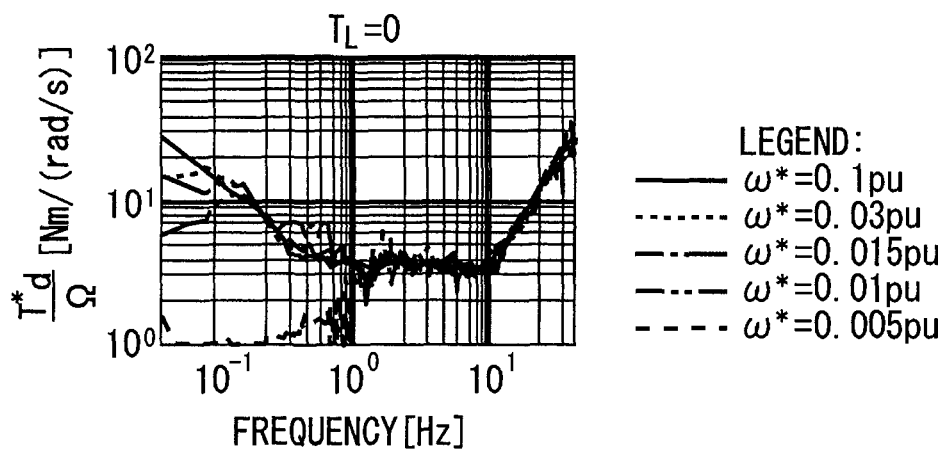
FIG. 14 is a graph showing motion control dynamic stiffness of control by the controller for the power converter according to the embodiment 1 of the present invention.
Figure 15:
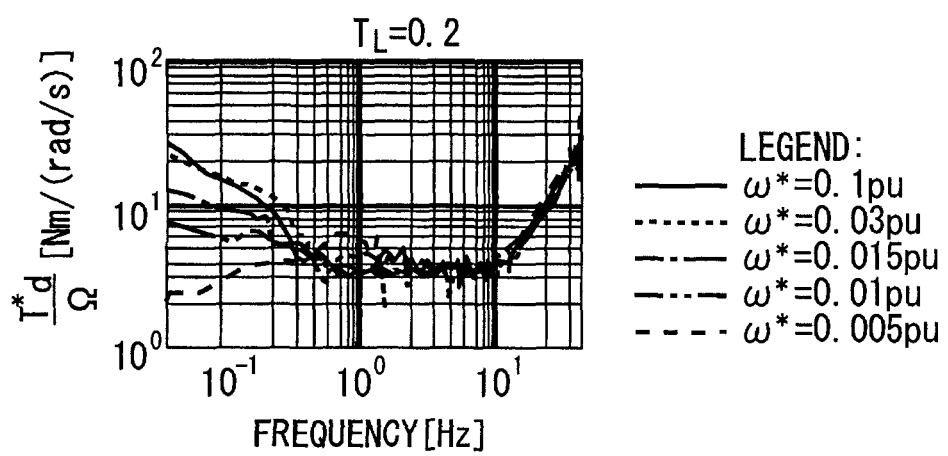
FIG. 15 is a graph showing motion control dynamic stiffness of control by the controller for the power converter according to the embodiment 1 of the present invention.
Figure 16:
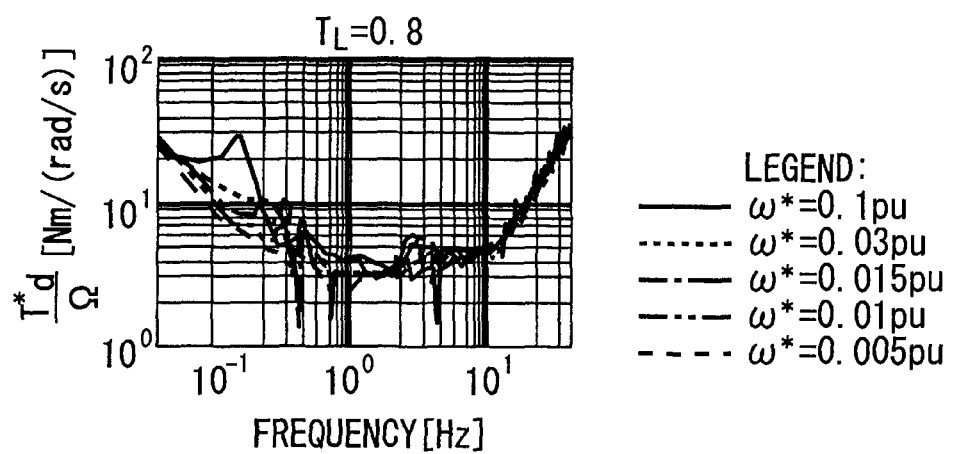
FIG. 16 is a graph showing motion control dynamic stiffness of control by the controller for the power converter according to the embodiment 1 of the present invention.
Figure 17:
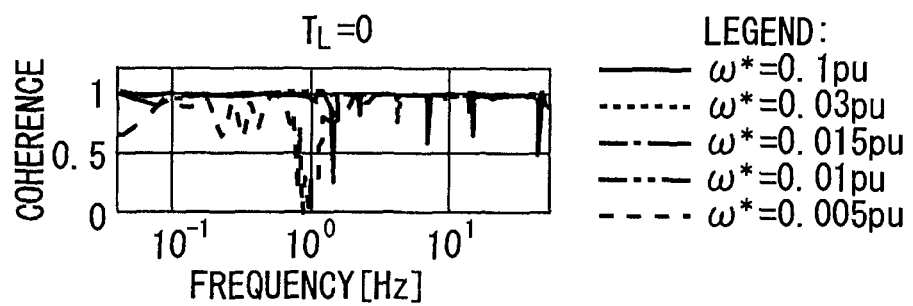
FIG. 17 is a graph showing coherence of motion control dynamic stiffness by the controller for the power converter according to the embodiment 1 of the present invention.
Figure 18:
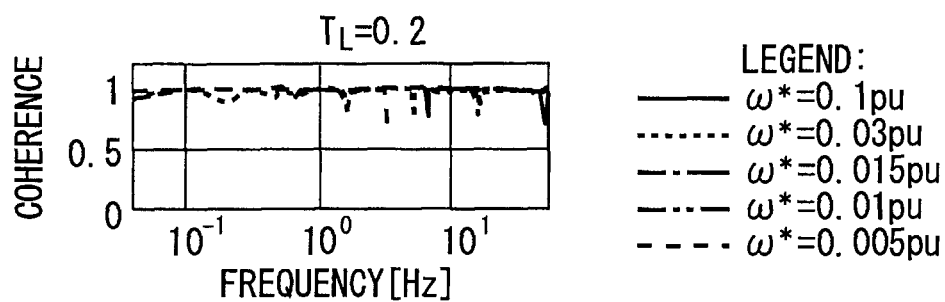
FIG. 18 is a graph showing coherence of motion control dynamic stiffness by the controller for the power converter according to the embodiment 1 of the present invention.
Figure 19:
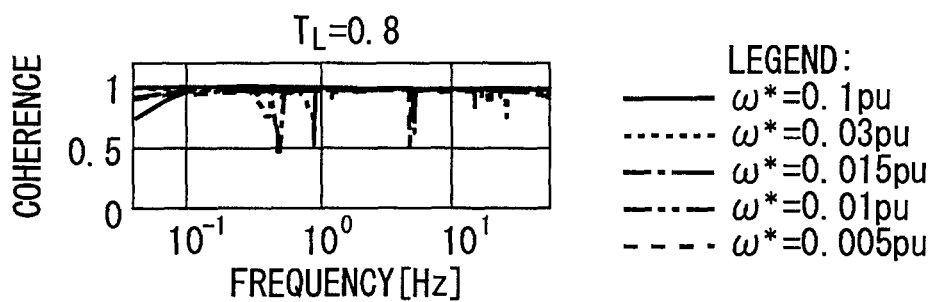
FIG. 19 is a graph showing coherence of motion control dynamic stiffness by the controller for the power converter according to the embodiment 1 of the present invention.

FIG. 14 to FIG. 16 are graphs showing the motion control dynamic stiffness of control by the controller for the power converter according to embodiment 1 of the present invention. FIG. 17 to FIG. 19 are graphs showing the coherence of the motion control dynamic stiffness by the controller for the power converter according to the embodiment 1 of the present invention.

As illustrated in FIG. 14 to FIG. 19, the dynamic stiffness is good in 0.01 pu speed of the motor 2 for 0-0.8 pu load conditions. As a result, the tracking for the stator flux of the motor 2 is easier.

Next, the cross zero speed operation will be described with the use of FIG. 20 to FIG. 25.

Figure 20:
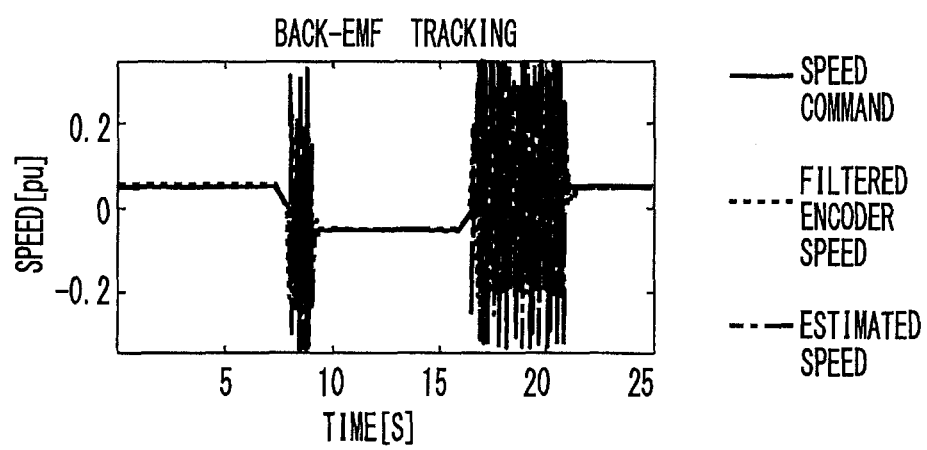
FIG. 20 is a graph showing speed of the motor not in control by the controller for the power converter according to the embodiment 1 of the present invention, but speed of the motor in control by a back-EMF tracking method.
Figure 21:
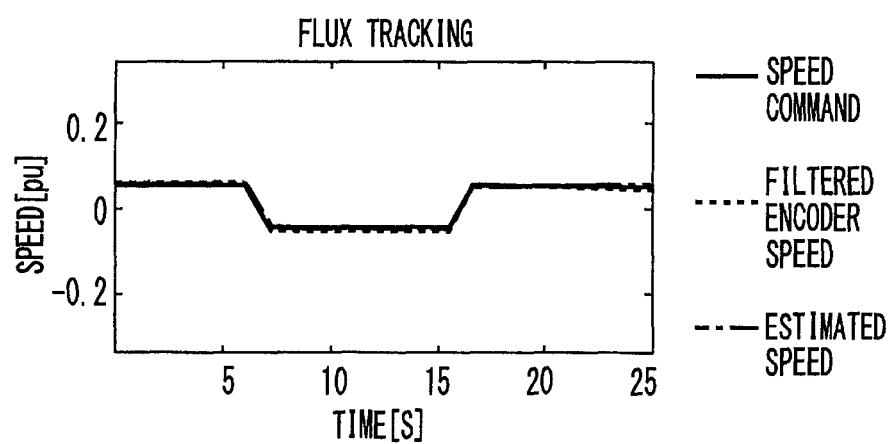
FIG. 21 is a graph showing speed of the motor in control by the controller for the power converter according to the embodiment 1 of the present invention.
Figure 22:
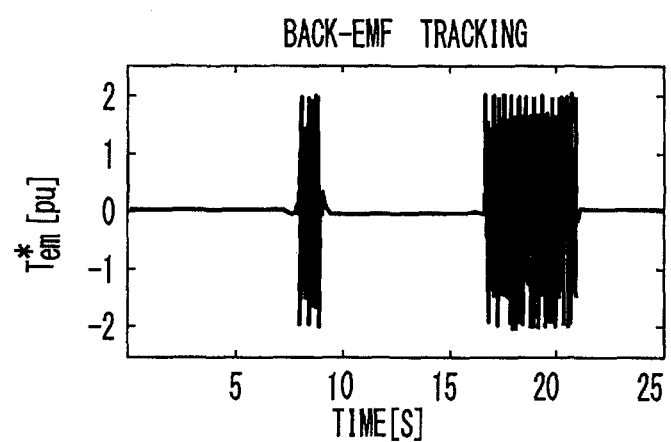
FIG. 22 is a graph showing the torque command of the motor not in control by the controller for the power converter according to the embodiment 1 of the present invention, but the torque command of the motor in control by back-EMF tracking method.
Figure 23:
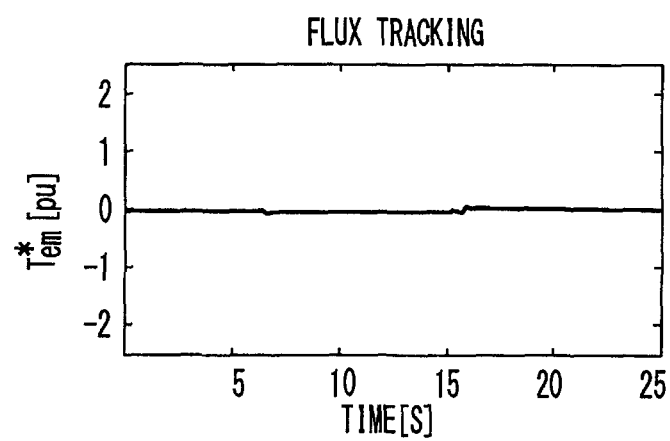
FIG. 23 is a graph showing the torque command of the motor in control by the controller for the power converter according to the embodiment 1 of the present invention.
Figure 24:
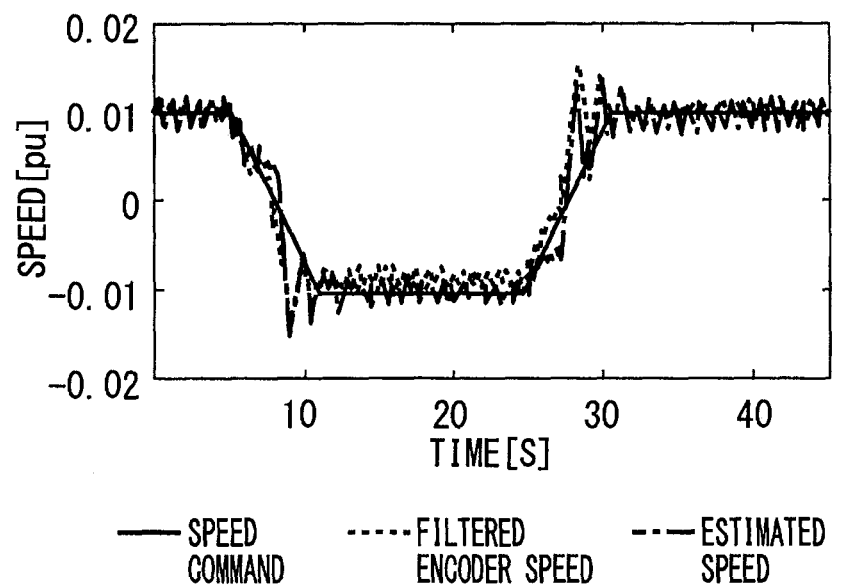
FIG. 24 is a graph showing speed of the motor in control by the controller for the power converter according to the embodiment 1 of the present invention.
Figure 25:
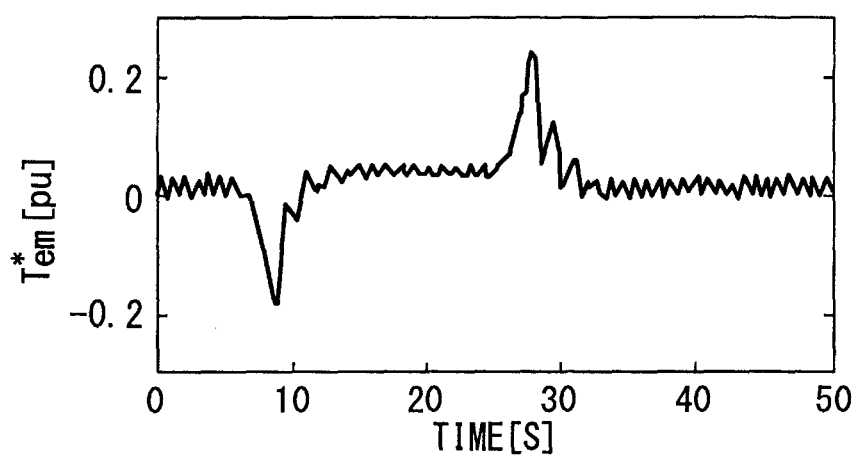
FIG. 25 is a graph showing the torque command of the motor in control by the controller for the power converter according to the embodiment 1 of the present invention.

FIG. 20 is a graph showing speed of the motor not in control by the controller for the power converter according to the embodiment 1 of the present invention but speed of the motor in control by a back-EMF tracking method. FIG. 21 is a graph showing speed of the motor in control by the controller for the power converter according to the embodiment 1 of the present invention. FIG. 22 is a graph showing the torque command of the motor not in control by the controller for the power converter according to the embodiment 1 of the present invention but load torque of the motor in control by a back-EMF tracking method. FIG. 23 is a graph showing the torque command of the motor in control by the controller for the power converter according to the embodiment 1 of the present invention. FIG. 24 is a graph showing speed of the motor in control by the controller for the power converter according to the embodiment 1 of the present invention. FIG. 25 is a graph showing the torque command of the motor in control by the controller for the power converter according to the embodiment 1 of the present invention.

In FIG. 20 to FIG. 21, speed command values change from 0.05 pu to −0.05 pu to 0.05 pu with acceleration rate 0.084 pu/s. As illustrated in FIG. 20 to FIG. 21, the cross zero speed operation in control by the controller 9 is smooth compared with control by a back-EMF tracking method.

In FIG. 22 and FIG. 25, speed command values change from 0.01 pu to −0.01 pu to 0.01 pu with an acceleration rate of 0.034 pu/s. As illustrated in FIG. 22 and FIG. 25, the cross zero speed operation in control by the controller 9 is comparatively smooth with a very small acceleration rate.

Next, the operation under a step load torque change of motor 2 will be described with the use of FIG. 26 to FIG. 34.

Figure 26:
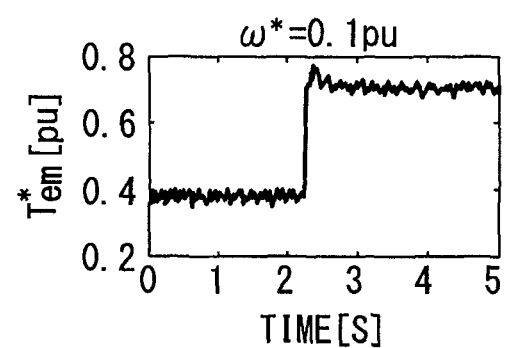
FIG. 26 is a graph showing the torque command of the motor in control by the controller for the power converter according to the embodiment 1 of the present invention under a step load torque change.
Figure 27:
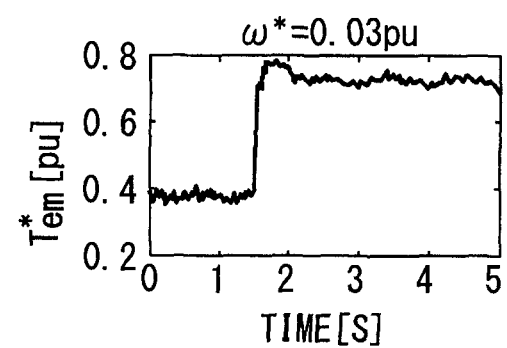
FIG. 27 is a graph showing the torque command of the motor in control by the controller for the power converter according to the embodiment 1 of the present invention under a step load torque change.
Figure 28:
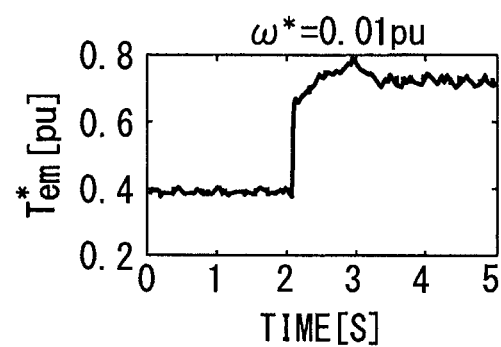
FIG. 28 is a graph showing the torque command of the motor in control by the controller for the power converter according to the embodiment 1 of the present invention under a step load torque change.
Figure 29:
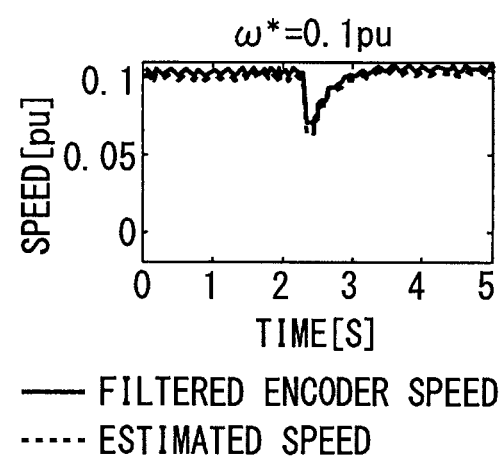
FIG. 29 is a graph showing speed of the motor in control by the controller for the power converter according to the embodiment 1 of the present invention under a step load torque change.
Figure 30:
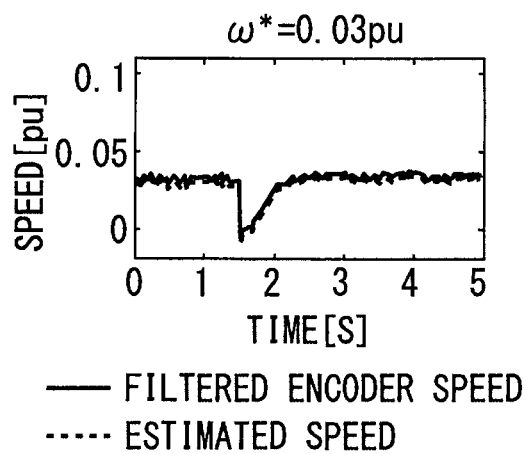
FIG. 30 is a graph showing speed of the motor in control by the controller for the power converter according to the embodiment 1 of the present invention under a step load torque change.
Figure 31:
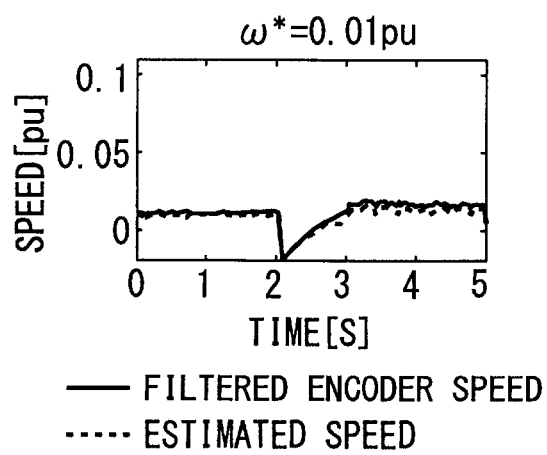
FIG. 31 is a graph showing speed of the motor in control by the controller for the power converter according to the embodiment 1 of the present invention under a step load torque change.
Figure 32:
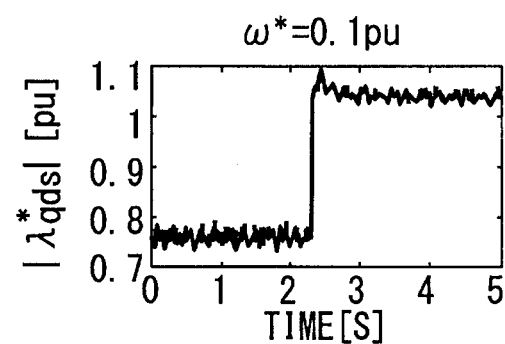
FIG. 32 is a graph showing a flux command value in control by the controller for the power converter according to the embodiment 1 of the present invention under a step load torque change.
Figure 33:
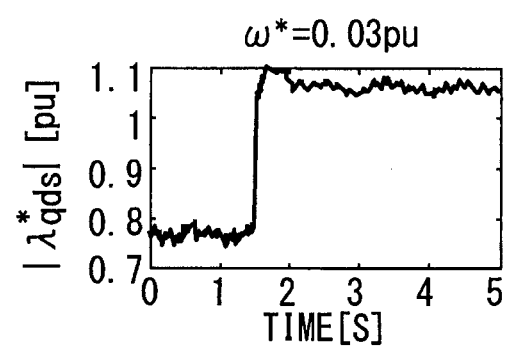
FIG. 33 is a graph showing a flux command value in control by the controller for the power converter according to the embodiment 1 of the present invention under a step load torque change.
Figure 34:
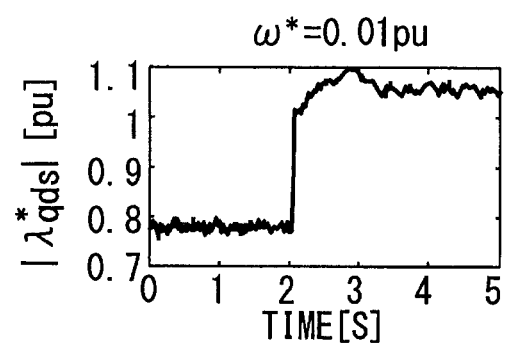
FIG. 34 is a graph showing a flux command value in control by the controller for the power converter according to the embodiment 1 of the present invention under a step load torque change.

FIG. 26 to FIG. 28 are graphs showing the torque command of the motor in control by the controller for the power converter according to the embodiment 1 of the present invention under a step load torque change. FIG. 29 to FIG. 31 are graphs showing speed of the motor in control by the controller for the power converter according to the embodiment 1 of the present invention under a step load torque change. FIG. 32 to FIG. 34 are graphs showing a flux command value in control by the controller for the power converter according to the embodiment 1 of the present invention under a step load torque change.

As illustrated in FIG. 26 to FIG. 28, the torque command changes from 0.4 pu to 0.7 pu when the load torque increases.

As illustrated in FIG. 29 to FIG. 31, the speed of the motor 2 reduces at the moment when the load torque is stepped up, but the speed of the motor 2 tracks the speed command value after short time.

As illustrated in FIG. 32 to FIG. 34, a flux command value of a stator of the motor 2 is calculated online according to the estimated speed and the load torque conditions to achieve a minimum steady state loss. For example, at a low load torque, the flux command value is small to reduce the total loss. For example, at a high load torque, the flux command value increases.

According to the embodiment 1 described above, the estimate value of the stator flux of the motor 2 is calculated by the corrected voltage command value. Accordingly, the estimation accuracy of a speed of the motor 2 drastically improves. As a result, it is possible to maintain control accuracy in a region of low speed of the motor 2.

Further, the current/flux estimation module 18 includes the current observer module 20, the first flux estimation module 21 and the second flux estimation module 22. Accordingly, it is possible to calculate the estimate value of the stator flux and rotor flux of the motor 2 more accurately.

Further, the torque of the motor 2 is estimated based on the estimate value of the stator flux and rotor flux. Accordingly, it is possible to calculate the estimate value of the torque of the motor 2 more accurately.

Figure 35:
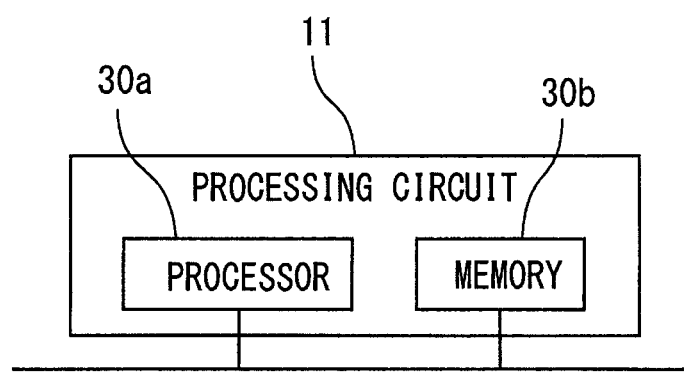
FIG. 35 is a hardware configuration diagram of the controller for the power converter according to the embodiment 1 of the present invention.

Next, an example of the controller with the use of FIG. 35.

FIG. 35 is a hardware configuration diagram of the controller for a power converter according to the embodiment 1 of the present invention.

As illustrated in FIG. 35, each function of the controller 9 is executed by the processing circuit. The processing circuit includes a processor 30a and a memory 30b.

For example, the processor 30a is a central processing unit (CPU), e.g., a central processing device, a processing device, a microprocessor, a microcomputer, a processor or a digital signal processor (DSP).

For example, the memory 30b is a non-volatile or volatile semiconductor memory such as RAM, ROM, flash memory, EPROM, EEPROM, or magnetic disk, flexible disk, optical disk, compact disk, mini-disk or DVD.

In the processing circuit, a program stored in the memory 30b is executed by the processor 30a.

Obviously many modifications and variations of the present invention are possible in the light of the above teachings. It is therefore to be understood that within the scope of the appended claims, the invention may be practiced otherwise than as specifically described.

What is claimed is:

1. A controller for a power converter configured to drive a motor, the controller comprising:
- a torque command value calculation module configured to calculate a torque command value based on a speed command value of the motor;
- an output voltage controlling module configured to control an output voltage of the power converter based on the torque command value calculated by the torque command value calculation module;
- a voltage command value correcting module configured to correct a voltage command value to the power converter based on the measured output voltage from the power converter;
- a flux estimation module configured to calculate estimate values of the stator flux and rotor flux of the motor in a subsequent control period based on the voltage command value corrected by the voltage command value correcting module and a measured current value of the stator; and
- a motor speed estimation module configured to calculate an estimate value of a speed of the motor in a subsequent control period based on the estimate value calculated by the flux estimation module,
- wherein the flux estimation module further comprises:
  - a current observing module configured to calculate an estimate value of the stator current in a subsequent control period based on the voltage command value corrected by the voltage command value correcting module and the measured stator current value;
  - a first flux estimation module configured to calculate an estimate value of the rotor flux of the motor based on an estimate value of an electrical angle of the motor and the measured stator current value; and
  - a second flux estimation module configured to calculate estimate values of the stator flux and rotor flux in a subsequent control period based on the voltage command value corrected by the voltage command value correcting module, the estimate value calculated by the current observing module and the measured stator current value.

2. A motor drive system comprising:
- a power converter configured to drive a motor; and
- the controller according to claim 1, the controller configured to control the power converter.

3. A controller for a power converter configured to drive a motor, the controller comprising:
- a torque command value calculation module configured to calculate a torque command value based on a speed command value of the motor;
- an output voltage controlling module configured to control an output voltage of the power converter based on the torque command value calculated by the torque command value calculation module;
- a voltage command value correcting module configured to correct a voltage command value to the power converter based on the measured output voltage from the power converter;
- a flux estimation module configured to calculate estimate values of the stator flux and rotor flux of the motor in a subsequent control period based on the voltage command value corrected by the voltage command value correcting module and a measured current value of the stator; and
- a motor speed estimation module configured to calculate an estimate value of a speed of the motor in a subsequent control period based on the estimate value calculated by the flux estimation module,
- wherein the motor speed estimation module is configured to calculate an estimate value of a phase of a flux vector based on the estimate value calculated by the flux estimation module and calculate an estimate value of the speed of the motor in a subsequent control period based on the estimate value of the phase of the flux vector.

* * * * *